United States Patent [19]

Duncan et al.

[11] 4,042,113

[45] Aug. 16, 1977

[54] SORTING DEVICE FOR MAGAZINE OR THE LIKE

[75] Inventors: Leroy A. Duncan, Lathrup Village; Steve M. Aksamit, Melvindale, both of Mich.

[73] Assignee: Standard Alliance Industries, Inc., Oak Brook, Ill.

[21] Appl. No.: 697,435

[22] Filed: June 18, 1976

[51] Int. Cl.[2] ............................................ B65G 47/34

[52] U.S. Cl. ........................... 209/74 R; 209/111.7 R; 271/35; 271/118; 198/367

[58] Field of Search ............... 209/74 R, 111.5, 111.7; 198/367, 636, 637; 271/35, 118, 277, 229

[56] References Cited

U.S. PATENT DOCUMENTS 3,414,126 12/1968 Vulcano ............................ 209/74 R 3,709,353 1/1973 Sheetz ................................ 198/367

*Primary Examiner*—Allen N. Knowles

*Attorney, Agent, or Firm*—Harness, Dickey & Pierce

[57] ABSTRACT

A device for separating, scanning and sorting publications bearing the Universal Product Code. The device comprises a flat bed extending horizontally but inclined to one side, along which move parallel belts at high speed. A loading bit or hopper at one end receives magazines stacked in random sequence. These are separated by means of the synchronized movement of stack lifting bars at the bottom of the bin and movable separating fingers downstream. The fingers drop on each magazine as it begins to pass beneath them, and the stack lifters are simultaneously raised to lift the remaining magazines off the belts. The fingers are lifted a short time after the trailing edge of the magazine passes them to ensure a gap between adjacent magazines. The stack lifters to drop as the trailing edge passes the fingers, without a time delay. Means are also provided for initially stepping back the leading edges of the magazines in a stack, this means comprising a novel forward wall construction for the bin, and flat springs between the stack lifters and the separator fingers.

The separated magazines pass a conventional scanner which, through a computer, controls shift registers corresponding in number to the diverter gates. The diverter gates include fingers which are rockable from a position flush with the bed to a diverting position in which a magazine impelled by the belts will strike the fingers and be diverted laterally. Concave scoop-like members are mounted adjacent each set of diverter fingers to aid the diverting action.

20 Claims, 14 Drawing Figures

FIG. 5.
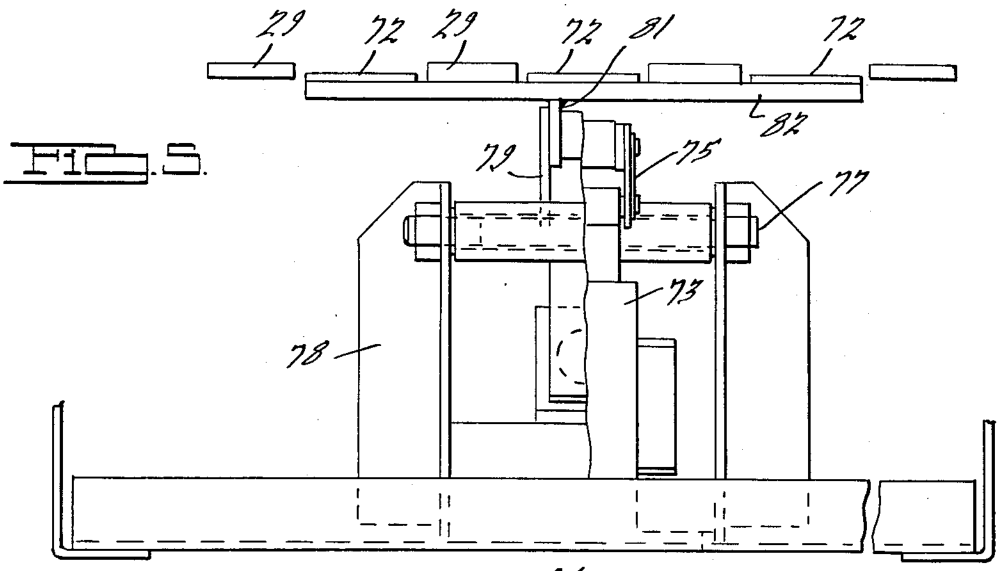
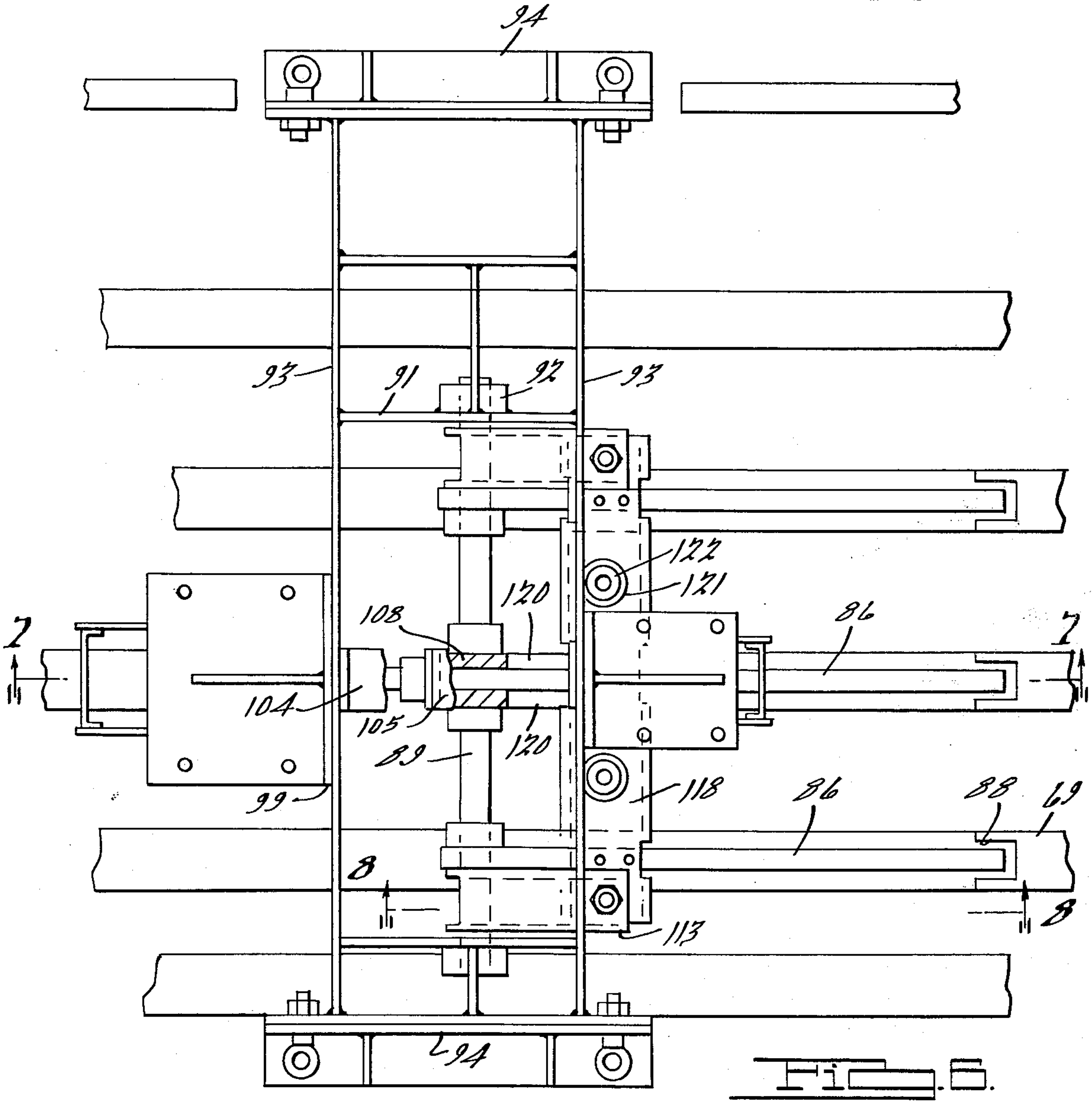
FIG. 6.

SORTING DEVICE FOR MAGAZINE OR THE LIKE

BACKGROUND OF THE INVENTION

The invention relates to the scanning, sorting and handling of magazines, periodicals, paperback books, or the like, especially those which are provided with the Universal Products Code (U.P.C.) bar code.

It is estimated that billions of magazines are shipped from distributors to retailers each week, approximately 40% of which are returned to the distributor for credit or other disposition. Sorting, arranging, counting, and totalling credits to retailers for these magazines, which come in random sizes and thicknesses and have different dates of publication, prices, etc. are tasks which have presented serious problems and are expensive to carry out. Recently, many magazines have been provided with markings known as the Universal Products Code (U.P.C) bar code which are for the primary purpose of being scanned at the checkout counters of supermarkets or other retailers. Typically, the U.P.C. Bar Code for a magazine or other publication will indicate the publisher, title, and date of publication in code form. A conventional scanner such as one manufactured by Acroscan Corp. of Warren, Michigan will convert this code for purposes of entry into a computer.

BRIEF SUMMARY OF THE INVENTION

It is an object of the present invention to provide a novel and improved scanner and sorter for magazines, periodicals, or the like which will handle a random assortment of magazines in rapid, yet reliable fashion, scanning U.P.C. bar codes and sorting them in accordance with preprogrammed data.

It is another object to provide a scanner and sorter of this character which includes novel and improved separating means for magazines which are loaded into the sorter in batches and in random order, the separating means ensuring that proper spacing exists between the magazines as they approach the code reader.

It is another object to provide improved separating means of this nature which acts in a synchronized manner to both delay entry of each magazine onto a conveyor, and positively halt magazines which have been carried by the conveyor downstream from the stack, the synchronized movement of these parts permitting high speed operation of the conveyor without detracting from the reliability of the separating means.

It is also an object to provide a scanning and sorting device of this character which has novel and improved diverting means coacting with a belt conveyor, the conveyor and diverting means being so constructed that magazines being carried at high speed along the conveyor are positively and accurately deflected laterally off the conveyor at the proper location.

Briefly, the invention comprises a sorter having an elongated bed, a hopper at one end of said bed for receiving a stack of magazines, belt means constantly movable along said bed, a portion of said belt means extending beneath said hopper, a scanner downstream from said hopper, diverter means on said bed downstream from said scanner, and separating means for ensuring that there is adequate space between magazines when they reach said scanner, said separating means comprising lifting means at the bottom of said hopper adjacent said belt means and movable between an upper position raising said magazines above said belt means and a lower position permitting the lowermost magazine to be removed from the stack by said belt means, separating finger means downstream from said lift means and movable between an upper position permitting the magazines on said belt means to pass therebelow and a lower position urged against said bed so as to intercept and stop an approaching magazine, means responsive to passage of the leading edge of a magazine beneath said finger means for moving the finger means to its lower position and said lifting means to its upper position, and means responsive to further movement of said magazine for lifting said fingers and lowering said lifting means.

In another aspect, the invention comprises separating means for flat objects, such as magazines, which are to be stack-loaded into a hopper and moved singly along a bed, comprising a conveyor extending along said bed and having a portion at the bottom of said hopper, stack lifting means alongside said conveyor at the bottom of said hopper, said lifting means being movable between an upper position in which the magazines are held away from said conveyor, and a lower position in which the lowermost magazine is engageable by said conveyor, separating finger means downstream from said lifting means and movable between an upper position in which said magazines are permitted to pass therebeneath and a lower position urged against said bed, means responsive to arrival of a first magazine at a predetermined point along said bed for causing said finger means to move to its lower position whereby the leading edge of a magazine approaching the finger means will be stopped thereby, means synchronized with said finger lowering means for causing said lifting means to move to its upper position, means responsive to the creation of an adequate space between the magazine held by said finger means and the next downstream magazine for lifting said finger means, and means synchronized with said last-mentioned means for lowering said lifting means.

In still another aspect, the sorter comprises an elongated bed inclined downwardly to one side, a plurality of belts movable along said bed, and diverter means on said bed comprising a plurality of diverter fingers rockable on a common pivot axis below the surface of said bed and in a plane parallel thereto, said axis being inclined with respect to the path of said belts so as to extend upwardly and rearwardly, said diverter fingers extending downstream therefrom parallel to said belts, and means for moving said fingers between a first position in which said fingers are substantially flush with said bed and a diverting position in which said fingers are inclined upwardly from said bed so as to deflect an article being carried by said belts laterally off said bed.

BRIEF DESCRIPTION OF THE DRAWINGS

FIG. 5 is a fragmentary rear elevational view taken in the direction of the arrow 5 of FIG. 2, parts being omitted, showing the actuating means for the stack lifting plates;

FIG. 9 is a logic diagram showing the means for synchronizing the movement of the stack lifting plates and the separating fingers;

DESCRIPTION OF THE PREFERRED EMBODIMENT

The scanning and sorting device is generally indicated at 21 and comprises an elongated base 22. The base may be provided with removable side plates 23, and has at one end a hopper generally indicated at 24 for the reception of stacks of randomly arranged magazines, periodicals, paperback books or the like. The device is particularly intended for use with items of this nature which carry along one edge or in one corner the vertical bars which comprise the U.P.C. bar code. Therefore, the publications placed in hopper 24 will be so oriented that the U.P.C. bar code may be properly read by a conventional U.P.C. code reader or scanner 25 located downstream from hopper 24.

Figure 1:
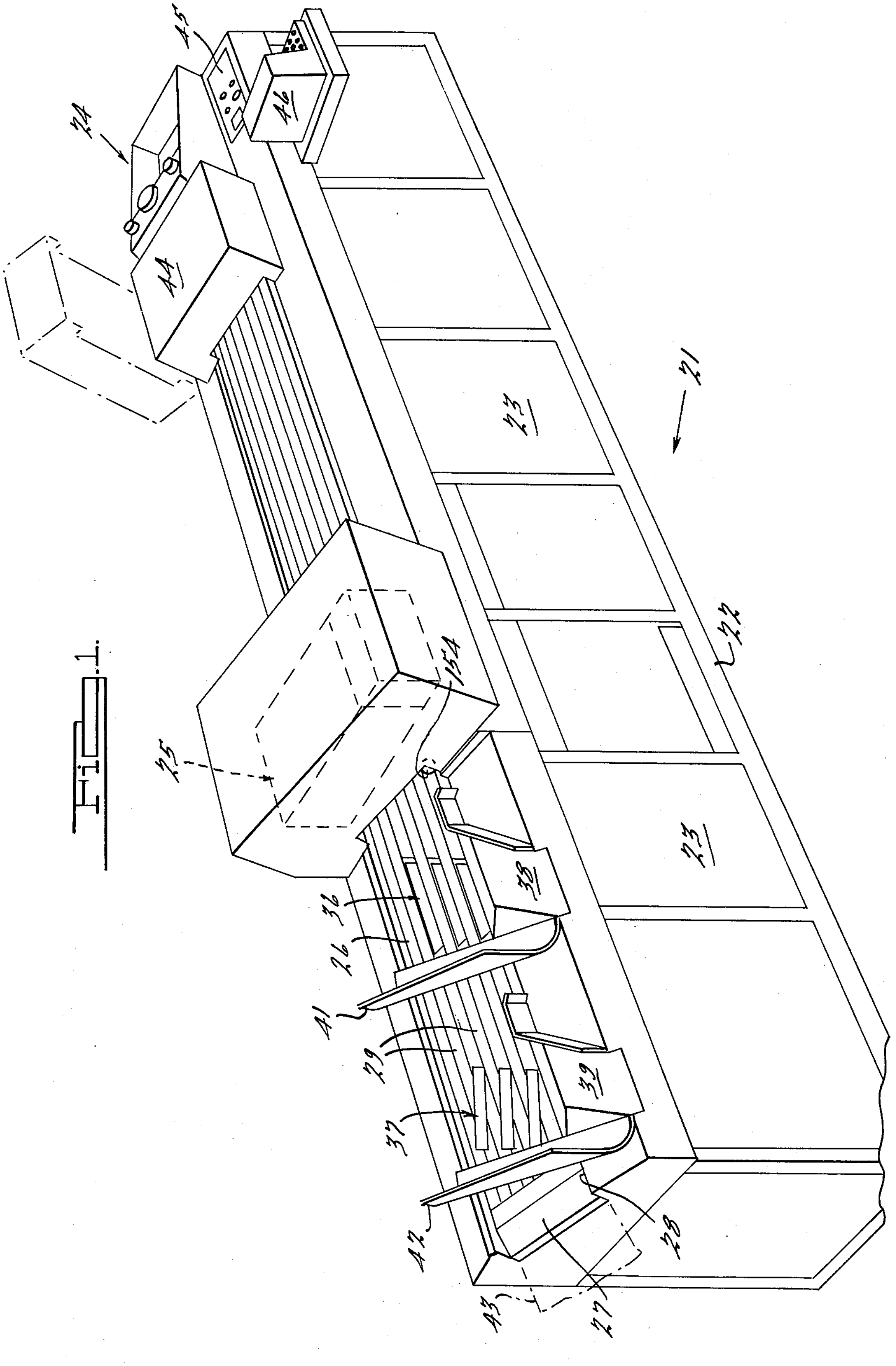
FIG. 1 is a perspective view of the magazine scanner and sorter of this invention.
Figures 2, 3, 4:
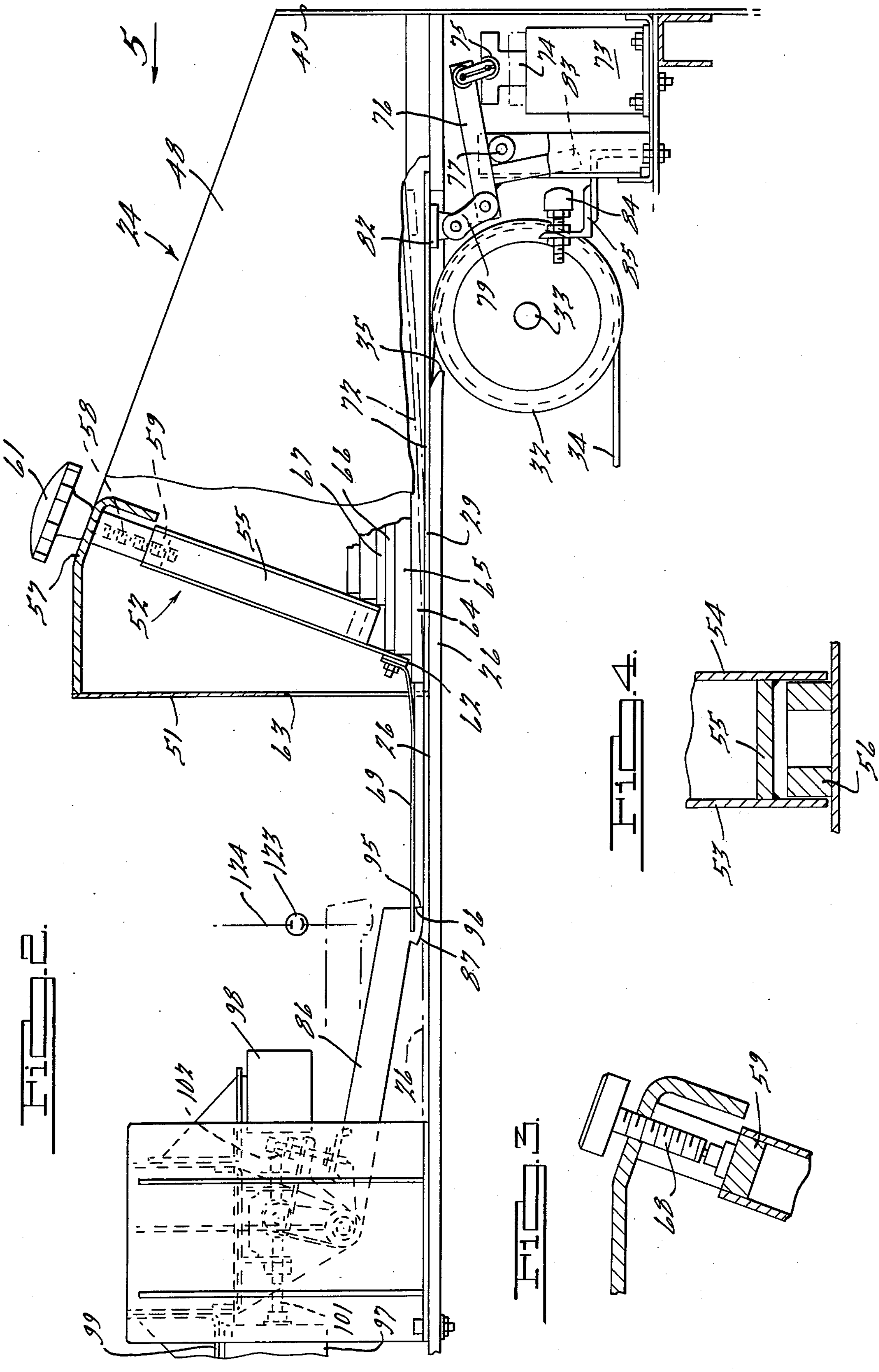
FIG. 2 is a partly sectioned side elevational view of the sorter showing the hopper and separating means.
FIG. 3 is a fragmentary cross-sectional view in elevation showing the locking means for the forward hopper wall.
FIG. 4 is a fragmentary cross-sectional plan view showing the guide means for the forward hopper wall.
Figure 7:
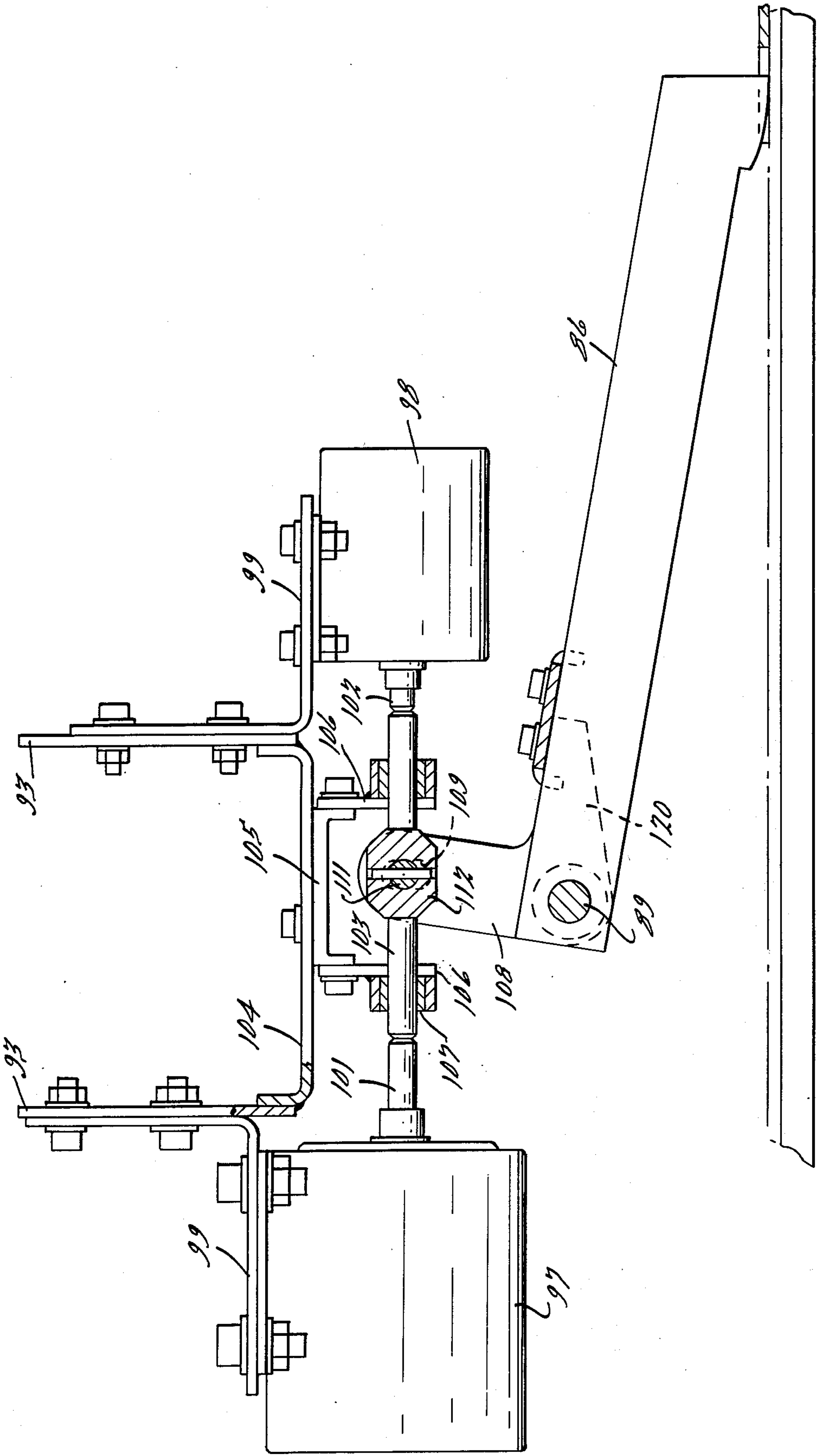
FIG. 7 is a cross-sectional view in elevation taken along the line 7—7 of FIG. 6 and showing the actuating solenoids for the separating fingers.

A flat bed 26 extends along the top of base 22 from beneath hopper 24 to the exit end 27 of the machine. The bed is inclined downwardly to one side of the machine as seen in FIG. 1, a shoulder 28 extending along the lower edge of the bed along which the magazines will ride. A plurality of endless belts 29 extend along and are supported by bed 27, four of such belts being shown in FIG. 1. The belts are driven by a motor shown schematically at 31 in FIG. 14 at the exit end of the device, idler pulleys 32 being located beneath hopper 24 and mounted on a shaft 33. The lower flights 34 of belts 29 are spaced below bed 26 and the upper flights pass through openings 35, one of which is seen in FIG. 2.

A plurality of diverting means, such as two generally indicated at 36 and 37 in FIG. 1, are located downstream from scanner 25, the construction of which are described in detail below. These diverting means are adapted to deflect the proper publications to chutes 38 and 39 respectively which lead to bins (not shown), tables or other desired means for receiving the diverted magazines. Scoop-shaped members 41 and 42 are mounted above the portions of bed 26 immediately downstream from diverters 36 and 37 respectively. These members are spaced above the bed and conveyor belts so as permit magazines to pass beneath them, but will aid in deflecting magazines which are diverted by the raising of the diverting means 36 and 37. A bin 43 is provided at the exit end of the machine so that magazines which pass diverting means 36 and 37 may be received. A swingable cover 44 also may be provided immediately downstream from hopper 24 for the protection of the separating means for the magazines which are described below. A control station 45 is mounted on the machine adjacent hopper 24, and a console 46 connected to a computer 47 (FIG. 14) is mounted adjacent the control station.

In a typical use for machine 21, a batch of magazines and other publications returned to a distributor from a retailer are divided into two groups, scannable publications and unscannable returns, such as certain newspapers and precounted bundles of magazines. A stack of scannable publications is placed in hopper 24 after the retailer code number has been entered in computer 47 and any previous stack of publications has been cleared. Entry of a control code in the computer will start the flow of magazines from hopper 24 to scanner 25.

At the scanner, the publication U.P.C. bar codes are "read" and compared with a list of valid code numbers stored in the computer memory. This will initiate predetermined command signals to divert the publication at the proper station. Although two diverting means are shown in the illustrated embodiment, a different number could be provided. Publications that cannot be read for some reason could be diverted to another location for different handling. Still other diverting stations could be provided for publications and must have their covers removed, are not valid returns, are to be returned to stock or the publisher, or to be destroyed. Because of the novel features of this invention, the rate of scanning and sorting can be very high.

The construction of hopper 24 is shown best in FIGS. 2, 3 and 4. The hopper comprises a pair of side walls 48, a relatively low rear wall 49 and a relatively high front wall 51. A gate generally indicated at 52 is mounted rearwardly of front wall 51 and inclined upwardly and rearwardly from the bottom of the hopper. Gate 52 comprises a front plate 53 and a rear plate 54 in spaced relation, the front plate extending below the level of the rear plate. The plates are joined at both sides by recessed members 55, and guides 56 are mounted on walls 48 and fit between plates 53 and 54 to permit movement of the gate along its inclined path. A rearward extension 57 is provided at the upper forward end of the hopper, and an adjusting screw 58 is preferably mounted in member 57 and threadably mounted in a member 59 at the upper end of gate 52. Rotation of a hand knob 61 on screw 58 will move the gate along its inclined path to preselect the space between the lower lip 62 of plate 53 and the upper surface of bed 26. The space may be chosen so as to allow the thickest magazine in a batch to pass therethrough, the magazines passing through an opening 63 in the lower portion of wall 51. This lowermost magazine is indicated at 64, and additional magazines 65, 66, 67, etc. will be offset rearwardly by their engagement with front plate 53 and rear plate 54. A pair of locking screws 68 are mounted in member 57 alongside knob 61 and are engageable with the top of member 59 to lock the gate in its preselected position.

Additional means in the form of flat springs 69 are provided for further causing stacked magazines to be offset rearwardly as they pass outwardly from the hopper. These flat springs are secured at their rearward ends 71 to the lower portion of front plate 53 in spaced parallel relation, and will press down on magazines as they pass through so that if there is more than one magazine passing through at a time, they will be spread out by frictional engagement with springs 69.

Means are provided at the bottom of hopper 24 for lifting a stack of magazines off belts 29 when it is desired to interrupt the feed. This means comprises a plurality of spaced parallel stack lifting plates 72, three such plates shown in the illustrated embodiment interposed between the four belts 29. Plates 72 are movable between a lower or solid line position shown in FIG. 2 and in upper or dot-dash line position. When in their lower position, the plates permit the lowermost magazine in the hopper to engage belts 29 and be fed forwardly. In their upper or lifting position, the plates prevent the magazines from being fed.

The means for actuating plates 72 comprises a solenoid 73 mounted rearwardly of pulleys 32 and having an armature 74 connected by a link 75 to an arm 76 pivoted at 77 to the frame by means of upstanding brackets 78. Extensions 79 are secured to arms 76 and are also rigidly secured to downward extensions 81 on a cross bar 82, the rearward ends of plates 72 being secured to bar 82. A downward extension 83 on arm 76 is engageable with an adjustable stop 84 mounted on a bracket 85. The forward ends of plates 72 are slidably supported by bed 26 adjacent the forward end of the hopper.

When solenoid 73 is de-energized, the weight of the magazines in hopper 24 will hold plates 72 in their lower position. Energization of solenoid 73 will raise the plates in their lifted position, and in doing so will move them slightly rearwardly. Thus, when the solenoid is again de-energized there will be a slight forward movement of the plates as they move to their lower position, aiding in the feeding of the magazines.

Figure 6:
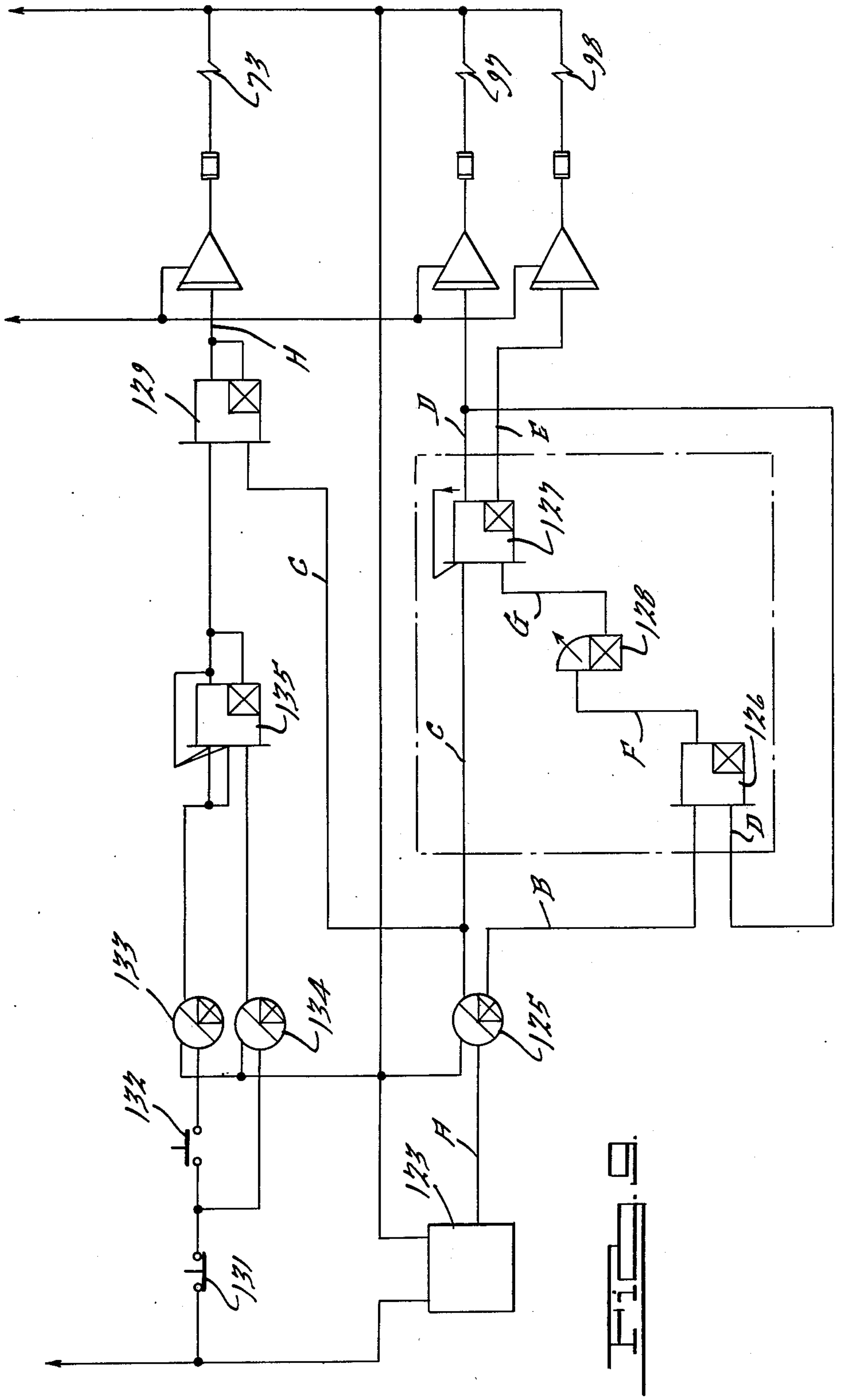
FIG. 6 is a fragmentary top plan view of the sorter in the area of the separating fingers.
Figure 11:
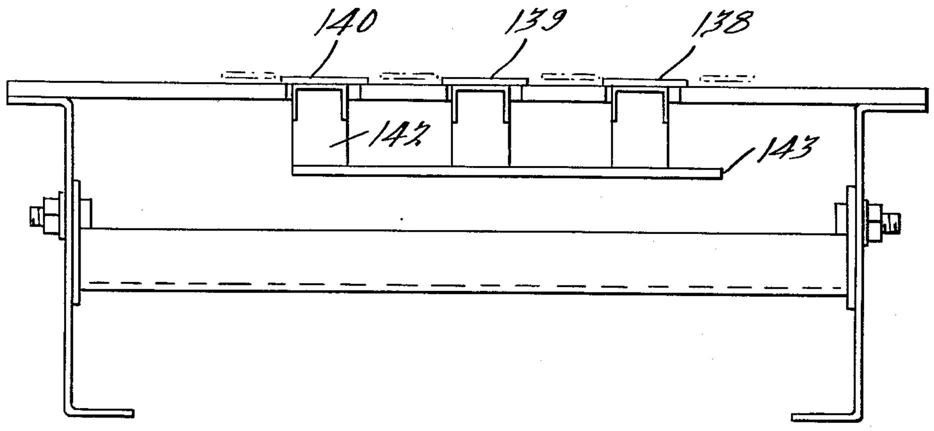
FIG. 11 is a cross-sectional view in elevation taken along the line 11—11 of FIG. 10 and showing the location of the diverting fingers between the conveyor belts.

A plurality of magazine separating fingers 86 are located downstream from hopper 24. As illustrated, three fingers are shown disposed between the four belts 72, the outer ends 87 of the fingers being located at the downstream ends of springs 69. For this purpose, clearance notches 88 may be provided in the springs as shown in FIG. 6.

The inner ends of the fingers are rockably mounted on a shaft 89, this shaft being rotatably supported by brackets 91 carrying bearings 92. Brackets 91 are carried by a pair of transverse plates 93 extending between brackets 94 secured to the frame. At least the outer portions of fingers 86 may be fabricated of a low friction material so as to permit sliding of the magazines thereunder.

Fingers 86 are movable between a lower position shown in solid lines in FIG. 2 and in upper position shown in dot-dash lines. In their lower position, fingers 86 are urged clockwise in FIG. 2 so that their tips 87 press downwardly against any magazine beneath them, and if the magazine slips past the downwardly urged fingers, their outer ends will then immediately engage bed 26. In this position, the upright outer surfaces 95 of the fingers, which are aligned, will block the further forward movement of the next approaching magazine by engaging its forward edge 96. The magazines themselves will be continually urged forwardly by belts 29 but will be positively prevented from further forward movement, so that the preceding magazine which has slipped under the fingers will become spaced downstream. The timed holding of fingers 86 in their lower position thus creates a gap or separation between the successive magazines, permitting them to be properly scanned. In their upper position, fingers 86 will be far enough above bed 26 to permit a previously blocked magazine to pass therebeneath.

The means for shifting fingers 86 between their positions comprises a pair of solenoids 97 and 98 referred to as the down solenoid and up solenoid respectively. These solenoids are mounted on the downstream and upstream plates 93 by brackets 99 and have plungers 101 and 102 which face each other. A bar 103 is aligned with the plungers and is slidably mounted below and between plates 93 by brackets 104 and 105, these brackets carrying downwardly extending brackets 106 which support bearings 107.

A pair of arms 108 are fixed to shaft 89 and have slotted upper portions 109 within which are disposed a pin 111 carried by an enlarged portion 112 of rod 103. Reciprocation of rod 103 will therefore cause rocking of shaft 89. A pair of brackets 113 are fixed to the outer ends of shaft 89 and carry adjustable screws 114, the lower ends of which have shoulders 115. These shoulders are slidably mounted on the unthreaded lower ends 116 of screws 114 and are urged downwardly by springs 117 against a cross bar 118 secured to the upper edges of the three fingers, as seen in FIG. 6. Springs 117 are held between shoulders 115 and shoulders 119 secured to screws 114. Thus, when shaft 89 is swung clockwise to move brackets 113 from their dot-dash line to their solid line position in FIG. 8, fingers 86 will be urged to their solid line position and will reach this position unless they engage a magazine, in which case springs 117 will be temporarily compressed until the magazine slides out from under the fingers and the latter snapped down against the bed.

Figure 8:
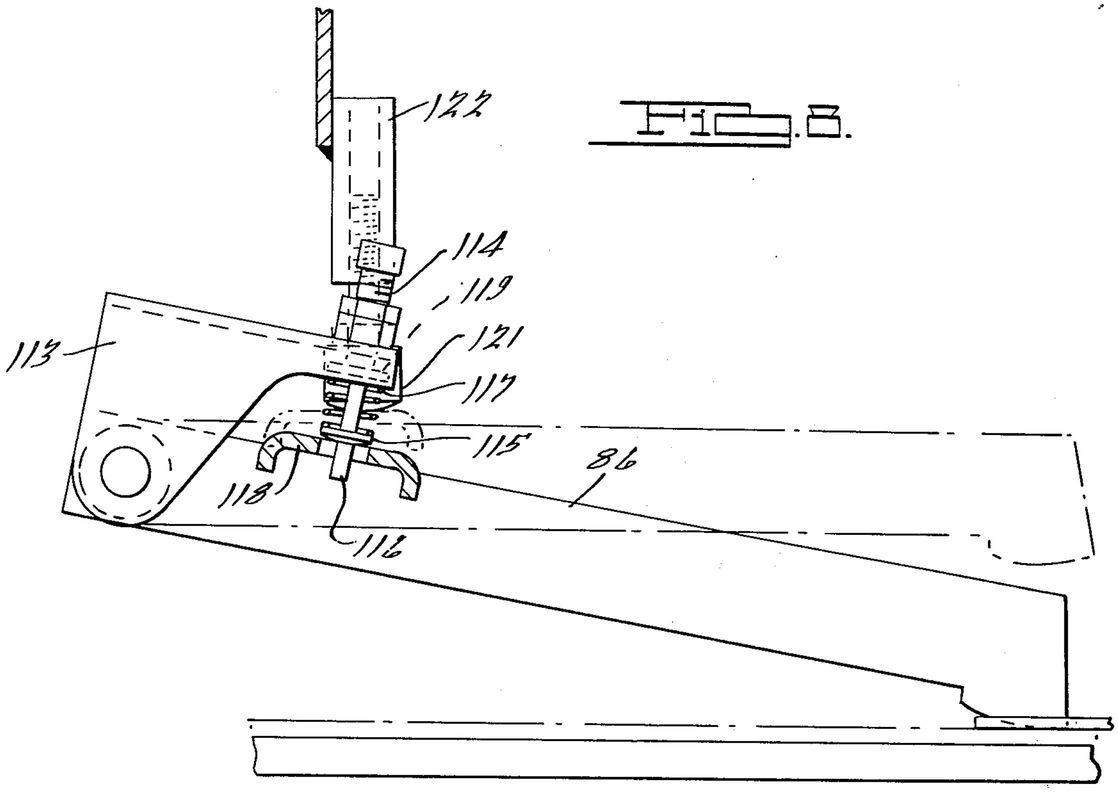
FIG. 8 is a cross-sectional view in elevation taken along the line 8—8 of FIG. 6 and showing the resilient connection between the separating finger actuating means and the fingers as well as the stop means for the upper finger position.

A pair of arms 120 are formed at the lower ends of arms 108 and extend underneath the central portion of cross bar 118, as seen in FIG. 6. When solenoid 98 is energized, these arms will lift cross bar 118 and thus raise fingers 86 to their lifted positions. A pair of adjustable stops 121 are secured to rearward plate 93 by threaded collars 122 and are engageable by the upper surface of cross bar 118 to define the lifted position of fingers 86, as shown in FIG. 8.

FIG. 9 shows a circuit diagram for controlling and synchronizing the movement of the stack lifting plates and spacing fingers. A photocell indicated schematically at 123 is located adjacent the outer ends of fingers 87 in a vertical plane indicated in dot-dash lines at 124 in FIG. 2, immediately downstream of the vertical surfaces 95 of fingers 86. This photocell will detect the arrival of the leading edge 96 of each magazine as the first portion of the magazine passes surfaces 95 and therefore cannot be stopped by the fingers.

The operation of the system of FIG. 9 may perhaps best be described with respect to a sequence with the initial condition being when the output of the photocell is de-energized (no magazine in its path). This output, indicated at A in FIG. 9, leads to a unit 125 which converts output A, for example, from 110 volts a.c. to 15 volts d.c. and has two outputs B and C so arranged that when one is energized, the other is de-energized. With A de-energized, C will be de-energized and B energized. B leads to an AND gate 126, the output F of which is de-energized because its input D is de-energized. The input D comes from the output of an AND gate 127 having C as one input. AND gate 127 is a sealed AND gate between output D and input C. Since C is de-energized at this point, so will D and F. F leads to an adjustable timer 128 having an output G which is energized when F is de-energized. G comprises the second input of gate 127.

C has a branch leading to an OR gate 129. The output H of OR gate 129 will be de-energized at this point so that solenoid 73 will be de-energized and stack lifting plates 29 will be in their lower position. Output D of AND gate 127 will be de-energized and output E energized so that solenoid 98 will be energized and fingers 86 in their raised position.

When the leading edge 96 of the magazine passes photocell 123, A will become energized. This will cause C to become energized and B de-energized, G remaining energized. C will cause H to become energized, energizing solenoid 73 and moving plates 29 to their lifted position, thus preventing further feeding of magazines from the hopper. With C energized, D will be energized and E de-energized, de-energizing solenoid 98 and energizing solenoid 97 to lower fingers 86.

When the trailing edge of the magazine sliding beneath fingers 86 passes photocell 123, its output A will become de-energized. This will cause B to become energized and C de-energized, but output D of AND gate 127 will remain energized because of its sealed nature. With B and D energized, F will become energized and timer 128 will begin to time out. With C de-energized, H will become de-energized which will de-energize solenoid 73 permitting the lifting plates 29 to descend by gravity and the weight of the stack above them. The lowermost magazine will thus be extracted from the stack and travel downstream.

When timer 128 times out, its output G will become de-energized. This will cause output D of AND gate 127 to become de-energized, in turn causing the output F of AND gate 126 to be de-energized. This will immediately energize the output G of timer 128.

De-energization of D will be accompanied by energization of E. This will energize solenoid 98 and de-energize solenoid 97, raising the separating fingers 86 which will meanwhile have been holding back the succeeding magazine. It will thus be seen that, as soon as the trailing edge of each magazine leaves the photocell 123, stack lifting plates 29 will drop but separating fingers 86 will be held in their lower position a short time longer to create the proper separation or spacing between the successive magazines.

FIG. 9 also shows means for manually raising and lowering the stack lifting plates in the form of switches 131 and 132, voltage changing units 133 and 134, and AND unit 135, the output of which is connected to OR gate 129. The operation of these controls, not being in themselves part of the present invention, need not be described in detail.

Figure 10:
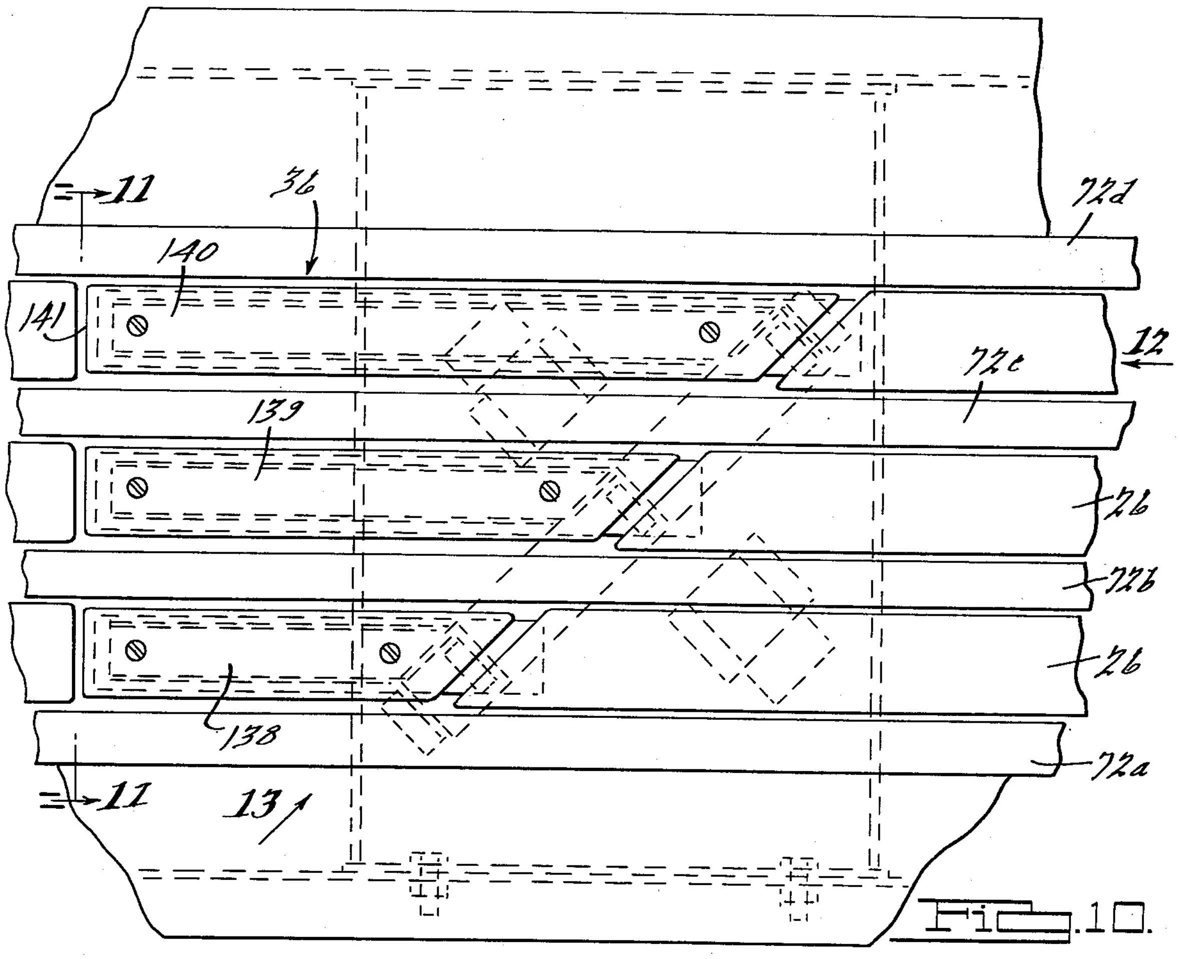
FIG. 10 is a fragmentary plan view of a portion of the sorter showing the diverting fingers and their mounting means.
Figure 12:
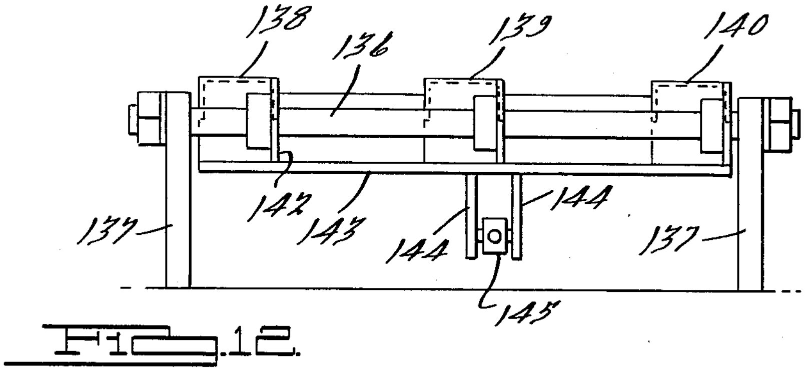
FIG. 12 is a fragmentary elevational view taken in the direction of the arrow 12 of FIG. 10 and showing the location of the finger pivot axis as well as the diverter actuating means.
Figure 13:
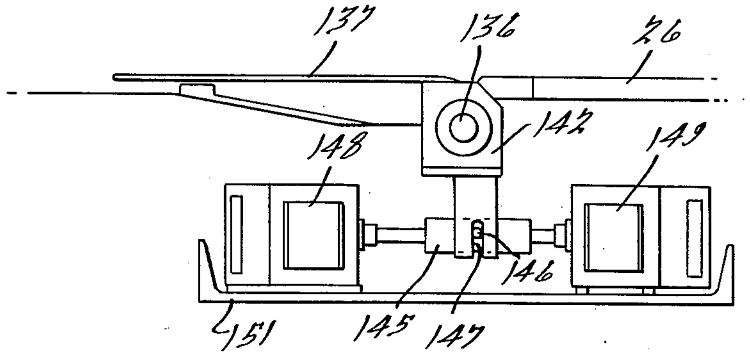
FIG. 13 is a fragmentary elevational view taken in the direction of the arrow 13 of FIG. 10 and showing the connection between the finger actuating means and the diverting fingers.

FIGS. 10–13 show the contruction of one of the diverting means 36 or 37, the illustrated diverter being indicated generally at 36. The diverting means comprises a shaft 136 rotatably mounted between brackets 137 below the level of bed 26. The shaft extends at an angle upwardly and rearwardly as seen in FIG. 10 and is parallel to the plane of bed 26 which, as indicated previously, tilts downwardly to one side. Bed 26 is cut away in the vicinity of the diverter to accommodate three fingers, 138, 139 and 140. These fingers are disposed between belts 72, finger 138 being located between the lowermost belt **72*a* and the next belt 72*b*, finger 139 being between belt 72*b* and belt 72*c* and finger 140 between belts 72*c* and 72*d*. The fingers are of increasing length so that their outer ends 141 are in line at right angles to the path of movement of the belts. The inner ends of fingers 138, 139 and 140 are fixed to individual brackets 142, rotatably mounted on shaft 136, the fingers having a channel-shaped construction as seen in FIGS. 12 and 13. A bar 143 connects the underside of brackets 142 and has a pair of downwardly extending parallel arms 144. A member 145 is disposed between arms 144 and carries a pin 146 disposed in slots 147 thereof. The opposite ends of member 145 are connected to solenoids 148 and 149 respectively which are mounted on a bracket 151 below the bed. Solenoid 148 when energized will move the fingers to a lower position flush with bed 26 and slightly below the level of the upper surfaces of belts 29 so that the fingers will not interfere with movement of the magazines. Energization of solenoid 149 will swing the fingers upwardly to their diverting position as shown in FIG. 1. Because of the geometrical arrangement of the parts, finger 140 will have the greatest movement and the fingers together with exert a positive deflecting movement on the magazines passing thereover, aided if necessary by scoop-shaped members 41 or 42.**

Figure 14:
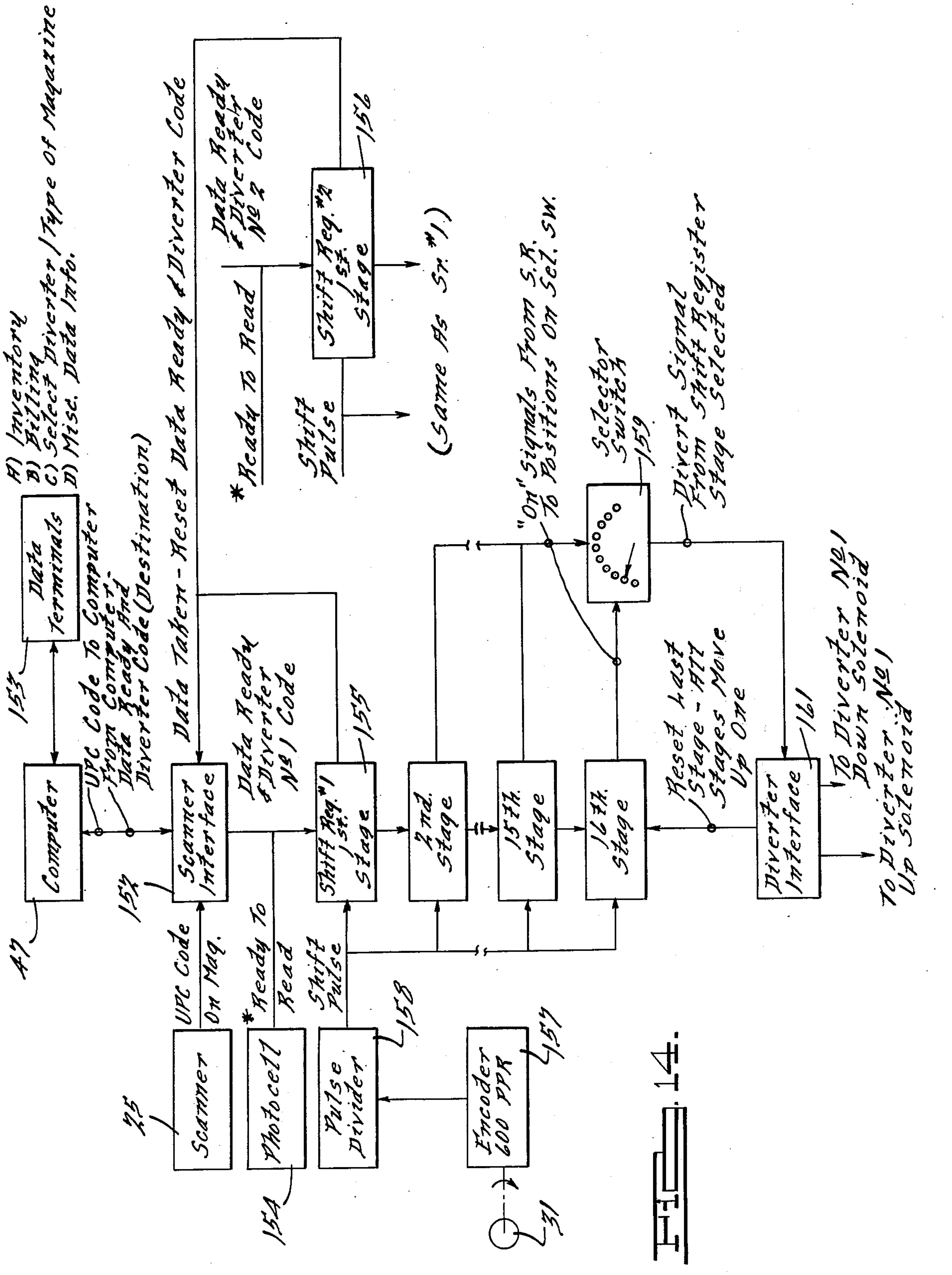
FIG. 14 is a schematic diagram showing the interconnections among the scanner, computer, shift registers, and diverter.

The operation of sorting device 21 is shown schematically in FIG. 14. Scanner 25 will read the UPC code on each magazine passing thereunder and will send this information through a scanner interface 152 to computer 47. The computer will take data derived from data terminals 153 and send back this information together with a "data ready" and diverter code or destination to the scanner interface.

When the magazine reaches the exit end of the scanner, it will pass a sensing device 154 such as a photocell which is indicated in FIG. 1. This will send a "ready to read" signal which causes the information from the scanner interface to enter one of a number of shift registers 155, 156, etc., depending upon the shift register number code received from a computer. The "ready to read" signal in effect locates the magazine on the conveyor at a precise point to start the shift register tracking, the photocell 154 thus acting to create a synchronizing point between the magazine on the conveyor and the shift register stage. Each shift register is provided with a number of stages which are fed from an encoder 157 driven by motor 31 which drives belts 29. The encoder feeds a pulse divider 158 which sends shift pulses to the various shift registers. As soon as the first stage of a shift register has received a pulse, it will send a "data taken" signal back to the scanner interface which will reset the "data ready" and diverter code so as to prevent the false entry of data bits.

"On" signals from the stages of each shift register are fed to a selector switch 159 for that register. For example, in the case of shift register 1, station 4 could be selected by switch 159. When an "on" signal from station 4 reaches the selector switch, a divert signal will be sent to a diverter interface 161.

The diverter interface will control operation of the up and down solenoids for that diverter (for example, 36 or 37) and will send a reset signal to the last stage of the shift register so that all the stages will move up one.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

We claim:

1. A sorter comprising an elongated bed, a hopper at one end of said bed for receiving a stack of magazines, belt means constantly movable along said bed, a portion of said belt means extending beneath said hopper, a scanner downstream from said hopper, diverter means on said bed downstream from said scanner, and separating means for ensuring that there is adequate space between magazines when they reach said scanner, said separating means comprising lifting means at the bottom of said hopper adjacent said belt means and movable between an upper position raising said magazines above said belt means and a lower position permitting the lowermost magazine to be removed from the stack by said belt means, and separating finger means downstream from said lifting means and movable between an upper position permitting the magazines on said belt means to pass therebelow and a lower position urged against said bed so as to intercept and stop an approaching magazine.

2. A sorter according to claim 1, said diverter means comprising a plurality of diverter fingers rockable on a common pivot axis below the surface of said bed and parallel thereto, said axis being inclined with respect to the path of said belts so as to extend upwardly and rearwardly, said diverter fingers extending downstream therefrom parallel to said belts, and means for moving said fingers between a first position in which said fingers are substantially flush with said bed and a diverting position in which said fingers are inclined upwardly from said bed so as to deflect an article being carried by said belts laterally off said bed.

3. A sorter according to claim 1, further provided with means responsive to passage of the leading edge of a magazine beneath said finger means for moving the finger means to its lower position and said lifting means to its upper position, and means responsive to further movement of said magazine for lifting said finger means and lowering said lifting means.

4. Separating means for flat objects, such as magazines, which are to be stack-loaded into a hopper and moved singly along a bed, comprising a conveyor extending along said bed and having a portion at the bottom of said hopper, stack lifting means alongside said conveyor at the bottom of said hopper, said lifting means being movable between an upper position in which the magazines are held away from said conveyor, and a lower position in which the lowermost magazine is engageable by said conveyor, separating finger means downstream from said lifting means and movable between an upper position in which said magazines are permitted to pass therebeneath and a lower position urged against said bed, and means responsive to arrival of a first magazine at a predetermined point along said bed for causing said finger means to move to its lower position whereby the leading edge of a magazine approaching the finger means will be stopped thereby.

5. Separating means according to claim 4, further provided with means synchronized with said finger lowering means for causing said lifting means to move to its upper position, means responsive to the creation of an adequate space between the magazine held by said finger means and the next downstream magazine for raising said finger means, and means synchronized with said last-mentioned means for lowering said lifting means.

6. Separating means according to claim 4, said last-mentioned means comprising sensing means responsive to arrival of the leading edge of a magazine past the ends of said finger means for moving the finger means to its lower position and said lifting means to its upper position.

7. Separating means according to claim 6, said sensing means being responsive to arrival of the leading edge of a magazine past the ends of said finger means for moving said lifting means to its upper position and responsive to arrival of the trailing end to lower said lifting means.

8. Separating means according to claim 7, further provided with timing means responsive to the actuation of said last-mentioned means for delaying the lifting of said finger means for a predetermined time.

9. Separating means according to claim 4, said bed being inclined downwardly to one side, said conveyor comprising a plurality of belts, said lifting means comprising plates disposed between certain of said belts, said finger means comprising a plurality of fingers disposed between said belts.

10. Separating means according to claim 4, further provided with flat spring means mounted above said conveyor between said lifting means and finger means and pressing downwardly against the magazines on said conveyor, whereby any stacked magazines on said conveyor will be at least partially separated by the frictional action of said flat springs.

11. Separating means according to claim 4, said hopper comprising an inclined front gate on its downstream side, and means for adjusting the height of said gate so that the distance between the lower end of the gate and said bed may be varied, the inclination of said gate being upwardly and rearwardly whereby stacked magazines will be partially separated thereby when urged thereagainst by said conveyor.

12. Separating means according to claim 11, said gate having a stepped portion at its lower end, the height of said stepped portion being such that magazines of normal thickness will be partially separated by engagement with the two steps.

13. Separating means according to claim 11, further provided with flat spring means mounted on said wall and extending forwardly therefrom above said bed, whereby said flat spring means will frictionally engage magazines thereunder and at least partially separate any stacked magazines.

14. Separating means according to claim 4, said conveyor comprising a plurality of belts, said lifting means comprising a plurality of plates disposed between said belts, said means for moving the lifting means between its positions comprising a lever movably mounted below said bed adjacent the rearward ends of said plates, and connected to the plates, the connection being such that when moving to their lifted position, said plates will move slightly rearwardly and when moved to their lower positions, the plates will move slightly forwardly, thereby imparting forward movement to a magazine resting thereon.

15. Separating means according to claim 4, said finger means comprising a plurality of fingers pivotally supported at their downstream ends, said finger moving means comprising resilient means whereby said fingers will yield to the presence of a magazine when urged to their lower positions.

16. Separating means according to claim 15, said resilient means comprising pivotally mounted arms, means for positively moving said arms, and spring means between said arms and said fingers.

17. A sorter comprising an elongated bed inclined downwardly to one side, a plurality of belts movable along said bed, and diverter means on said bed comprising a plurality of diverter fingers rockable on a common pivot axis below the surface of said bed and in a plane parallel thereto, said axis being inclined with respect to the path of said belts so as to extend upwardly and rearwardly, said diverter fingers extending downstream therefrom parallel to said belts, and means for moving said fingers between a first position in which said fingers are substantially flush with said bed and a diverting position in which said fingers are inclined upwardly from said bed so as to deflect an article being carried by said belts laterally off said bed.

18. A sorter according to claim 17, said diverter fingers being of varying lengths whereby the downstream ends of said fingers are aligned at right angles to the path of said belts.

19. A sorter according to claim 17, said means for moving said diverter fingers between their positions comprising brackets secured to said fingers, and a bar connecting said brackets.

20. A sorter according to claim 17, further provided with a concave scoop-like member mounted above said bed downstream of said diverter fingers.

* * * * *